United States Patent [19]

Rodi et al.

[11] Patent Number: 4,488,107
[45] Date of Patent: Dec. 11, 1984

[54] ELECTRICAL SAFETY DEVICE FOR CONTROLLING A PRINTING MACHINE

[75] Inventors: Anton Rodi, Leimen; Edgar Schmidt, Grasellenbach; Dieter Uhrig, Eberbach, all of Fed. Rep. of Germany

[73] Assignee: Heidelberger Druckmaschinen AG, Heidelberg, Fed. Rep. of Germany

[21] Appl. No.: 374,246

[22] Filed: May 3, 1982

[30] Foreign Application Priority Data

May 2, 1981 [DE] Fed. Rep. of Germany ....... 3117338

[51] Int. Cl.³ .............................................. H02J 3/12
[52] U.S. Cl. .................................................... 323/340
[58] Field of Search ............... 101/DIG. 15; 323/255, 323/256, 257, 258, 340, 341, 343

[56] References Cited

U.S. PATENT DOCUMENTS

| | | | |
|---|---|---|---|
| 2,680,832 | 6/1954 | Schultz | 323/256 |
| 2,721,969 | 10/1955 | Van Ryan et al. | 323/255 |
| 2,730,671 | 1/1956 | Van Ryan | 323/256 |
| 2,901,684 | 8/1959 | Bronikowski | 323/256 |
| 2,927,225 | 3/1960 | Phillips | 323/255 X |
| 3,081,426 | 3/1963 | Bakke | 323/255 |
| 3,818,321 | 6/1974 | Willner et al. | 323/258 |
| 4,204,147 | 5/1980 | Larrabee | 323/257 |

FOREIGN PATENT DOCUMENTS

819801 4/1981 U.S.S.R. ........................... 323/255

Primary Examiner—William M. Shoop
Attorney, Agent, or Firm—Herbert L. Lerner; Laurence A. Greenberg

[57] ABSTRACT

Electrical safety device for controlling a printing machine having a control transformer with a plurality of primary and secondary taps for varying voltage levels including respective control lines connected to the secondary taps, a voltage monitoring device connected in a respective control line of one of the secondary taps, and a voltage changing switching device operatively associated with one of the primary taps, the voltage monitoring device being coupled with the voltage changing switching device.

14 Claims, 4 Drawing Figures

ELECTRICAL SAFETY DEVICE FOR CONTROLLING A PRINTING MACHINE

The invention relates to an electrical safety device for controlling a printing machine and, more particularly, to such a device having a power or control transformer with a plurality of primary and secondary taps for different voltage levels.

All commercially available electronic units or electro-magnetic components which are used in a control system for a printing press, are designed for certain voltage ranges so that deviations in the voltage of the public power supply within a given tolerance range will have no harmful effects. However, in the case of industrial power supplies, greater voltage variations or fluctuations are likely which are beyond the voltage tolerance range of the electronic units and electro-magnetic components, respectively, and are dependent, amongst others, upon the loading of the supply system, the distance between the consumer and the power station, and the like.

The instant the voltage deviations of the power supply system exceeds the upper voltage tolerance limit, there exists, at least, the danger of the electronic or electro-mechanical components being damaged or destroyed by an overvoltage, for example, burn-out of the contactors. On the other hand, a voltage below the rated value i.e. an undervoltage, is likewise as dangerous as an overvoltage because it can cause the performance of faulty functions in the control system. For example, the pull force needed for the operation of contactors may no longer be assured, relays may be switched off or faulty switching may occur in electronic circuits. Improper functioning of a machine and damage thereto may be the consequences.

Because of the high connected loads and the high powers to be transmitted, respectively, power transformers of printing presses are normally permanently wired and, for this reason, matching thereof with a line voltage deviating from the rated line voltage, notwithstanding moreover the danger of errors being made in the wiring, is very time-consuming and is possible only with relatively great expense. For this reason, there is a need for producing power or control voltages for a printing press which are as stable as possible, and which should preferably lie in the middle of the given tolerance band or range.

It is accordingly an object of the invention to provide an electrical safety device for controlling a printing machine wherein the operational reliability of the control system is enhanced and all electro-mechanical and electronic control units and the components thereof are safeguarded against damage or destruction which might otherwise be caused by voltage deviations or fluctuations. A further object of the invention to provide such a device which prevents uncontrolled functions in the operation thereof, the personnel responsible for operation thereof being given an opportunity to match the power or control voltage to the line voltage.

With the foregoing and other objects in view, there is provided, in accordance with the invention, an electrical safety device for controlling a printing machine having a control transformer with a plurality of primary and secondary taps for varying voltage levels including respective control lines connected to the secondary taps, a voltage monitoring device connected in a respective control line of one of the secondary taps, and a voltage changing switching device operatively associated with one of the primary taps, the voltage monitoring device being coupled with the voltage changing switching device.

The safety device according to the invention provides the advantage that not only the control voltages can be monitored for undesirable voltage fluctuations, but furthermore, simultaneously, erros in the manner in which the primary side of the transformer is connected to the rest of the system are also monitorable, the pressman or other operating personnel then being able to begin voltage matching in line with changed voltage conditions immediately after an error signal has been given. Because the operation of the voltage monitoring unit is limited to a single fixed voltage range, a further advantage is attained in that the safety device according to the invention may be produced and assembled with the printing press simply in a relatively simple and economical manner.

The last-mentioned advantage is further increased by the fact that, in accordance with another feature of the invention, the voltage monitoring device has an overvoltage comparator and an undervoltage comparator; thus, the safety device of the invention furthermore only requires limited space in the printing press. Because overvoltage and undervoltage comparison is undertaken in a single component, the likelihood of troubling conditions with the safety device is considerably minimized, and the printing machine is therefore more dependable.

In accordance with a further feature of the invention, the voltage monitoring device includes an error signal memory having a resetting device, whereby an advantage of a defined error signal is produced which directs the pressman or other worker to the fact that there is a voltage error, that is to say a need for checking out the supply voltage.

In order to ensure a switch-over of the voltage with a minimum interruption time for cancelling or erasing the error, the voltage changing switching device has two additional voltage interruption positions besides an undervoltage terminal and an overvoltage terminal so that there is no chance of the printing press being put into operation again without the memory being cancelled or erased.

One possible way of preventing a change-over in the voltage by chance, i.e. without such change-over in fact being desired, while the press is being operated with the rated voltage in the given tolerance range is, in accordance with the invention, to provide the voltage changing switching device with an electromechanical arresting device.

Other features which are considered as characteristic for the invention are set forth in the appended claims.

Although the invention is illustrated and described herein as embodied in electrical safety device for controlling a printing machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
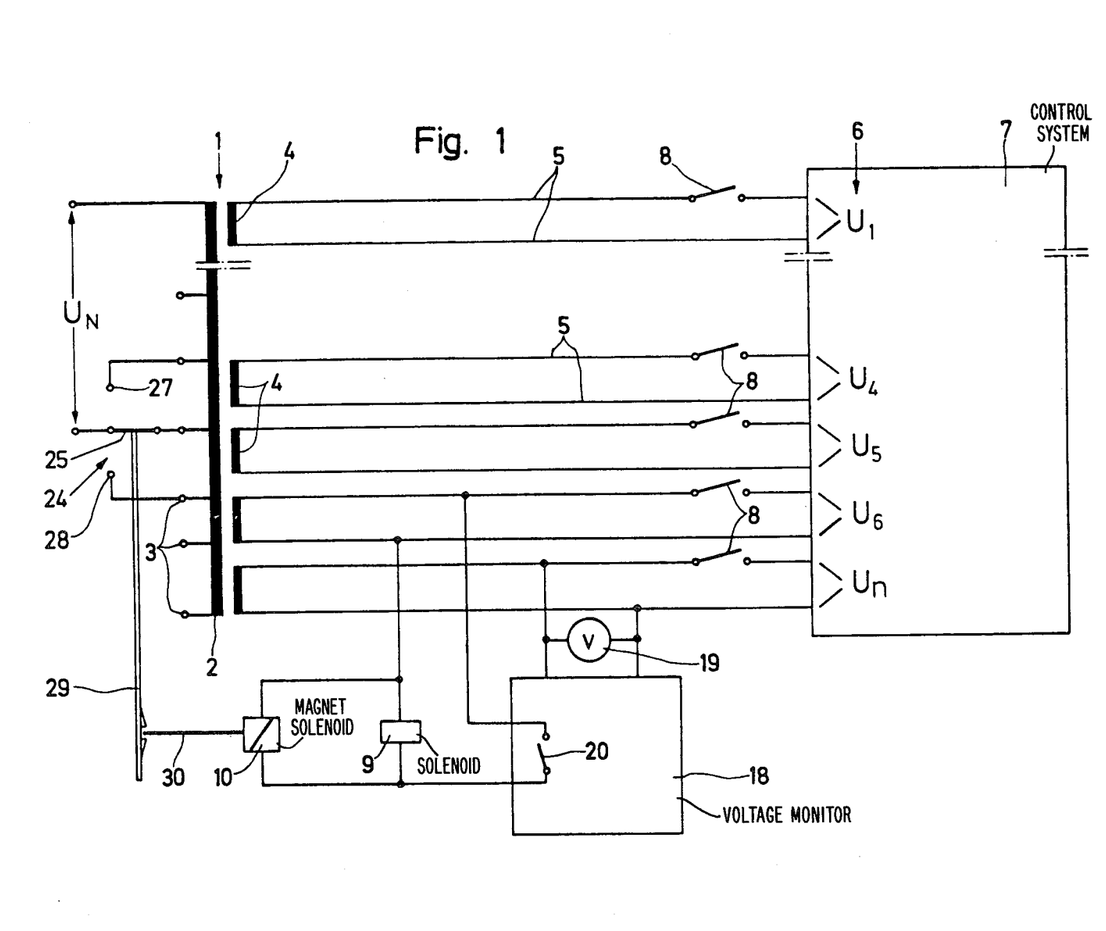
FIG. 1 is a basic circuit diagram of the power supply unit of a printing machine with a diagrammatic representation of a basic construction of a safety unit according to the invention.

Referring now to the drawing and first, particularly, to FIG. 1 thereof, there is shown a power transformer 1 for a printing machine, the transformer being designed for all line voltages used world-wide. The primary coil 2 of the transformer is continuous and has a number of rated or transmission voltage terminals 3 which are hereinafter referred to as primary taps. Each primary tap 3 is rated for a given voltage value so that, depending upon the voltage of the existing electric power system, rated voltages of varying levels may be applied to one of the primary taps 3 of the transformer 1 as an input voltage, for example the rated voltage $U_N$ represented in FIG. 1.

The secondary side of the power transformer 1 is formed of a number of mutually separate secondary windings 4 which are referred to hereinafter as secondary taps. The secondary taps 4 are connected via supply lines 5 with loads 6, such as contactors, brakes, motors, electronic control units and the like, for example, of a printing press control system 7, shown merely diagrammatically in FIG. 1, such loads 6 requiring different supply voltages $U_l$ and $U_n$ an operating voltages.

For safeguarding the loads 6, contactors 8 are connected into the supply lines 5, the contactors 8 being actuatable via a common driving contactor solenoid 9 for cutting off the supply voltages i.e. separating the loads 6 from the various supply voltages. The solenoid 9 of the contactors 8 is connected in parallel with a magnet solenoid 10, both solenoids 9 and 10 being supplied with a common supply voltage, for example $U_6$ in FIG. 1.

One of the supply voltages coming from the secondary taps 4 of supply transformer 1 is continually measured and monitored as representative of all of the other supply voltages, because the ratio of division between the individual supply voltages always remains constant due to the number of turns of the secondary windings 4. In this regard, a supply voltage is preferably used which is present at every printing press independently of the size and type or make thereof, as well as of the place of installation thereof. In the generalized embodiment of FIG. 1, this is the supply voltage $U_n$.

A voltage monitor 18 in the form of an under- and over-voltage relay is connected to the source of this voltage $U_n$, the monitor 18 being connected in parallel with a voltage readout or checker in the form of a voltmeter 19, the scale of which is subdivided into three characteristic voltage ranges, namely an under-voltage range, a normal voltage range and an overvoltage range, the voltage tolerance limits being marked by green and red bars, respectively. The voltage monitor 18 has a normally open contact 20 which is connected in series with the contactor coil or solenoid 9.

A voltage change-over switch unit 24 is connected to the primary winding 2 of the power transformer 1 and is provided with a switching contact 25. In the horizontal position of the switching contact 25 shown in FIG. 1, the line voltage $U_N$ is applied to one of the primary taps 3 of the power transformer 1. The voltage switching unit 24 has an undervoltage terminal 27 and an overvoltage terminal 28 and, as shown diagrammatically in FIG. 1, the switching contact 25 is coupled with a detent lever or arm 29 having a lower end in which a switching plunger 30 of the solenoid 10 engages.

Figure 2:
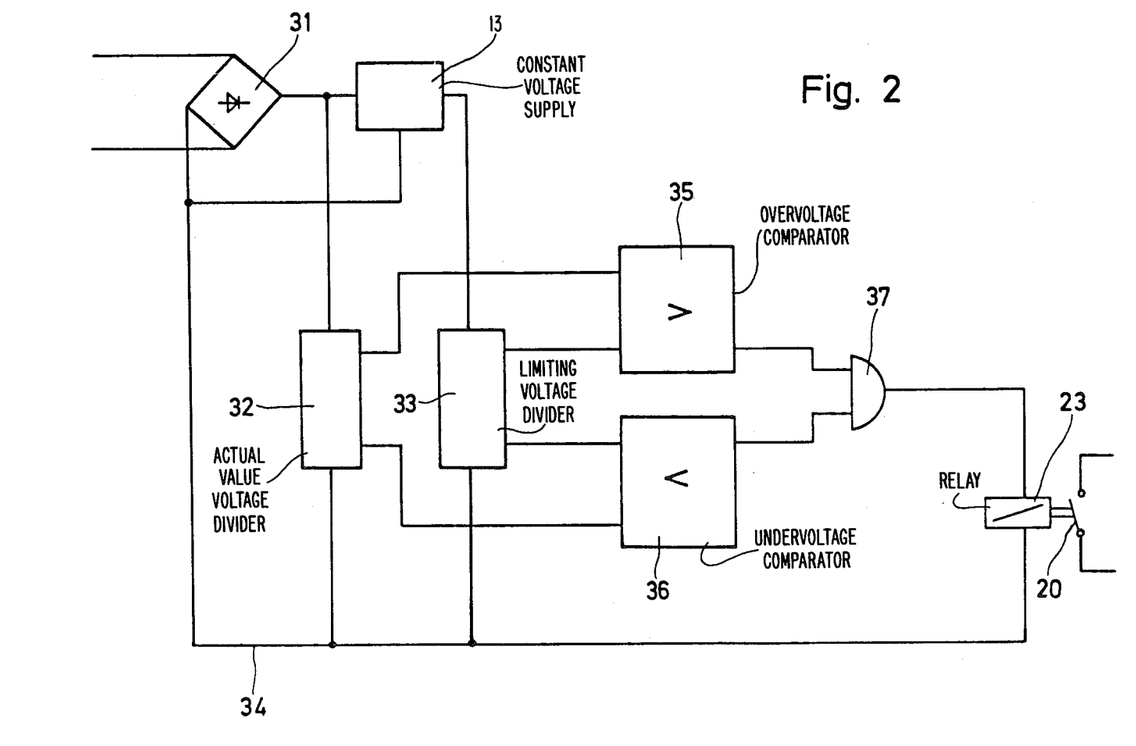
FIG. 2 is a block diagram of a voltage monitoring unit forming part of the basic construction of the safety unit of FIG. 1.

The construction and manner of operation of the voltage monitor 18 and the use of the voltage change-over switch unit 24 are described hereinafter in greater detail in connection with the schematic and diagrammatic view of the basic construction of the voltage monitoring unit according to FIG. 2.

The supply voltage $U_n$ is applied as AC to a rectifier 31 in which it is converted to DC. The DC voltage ensures the operation of the voltage monitor 18 per se and is fed to an actual-value voltage divider 32 forming two actual values for the voltage which maintain a fixed relationship with respect to the input voltage. Connected in parallel with the actual-value voltage divider 32 is a limiting voltage divider 33 supplied from a pre-connected constant voltage supply 13 with a constant DC voltage, two voltage rated or nominal values being formed continually therefrom, such rated or nominal values being independent of the variations or fluctuations in the input voltage of the rectifier 31. The two voltage dividers 32 and 33 may, for example, be constructed as operational amplifiers and are connected to a reference or ground 34.

The actual voltage values and the rated or nominal voltage values are fed in the form of signals together, respectively, to an overvoltage comparator 35 and an undervoltage comparator 36 for a comparison between nominal and actual values, such comparison units being post-connected to the output of the voltage dividers 32 and 33. The overvoltage comparison unit 35 is programmed with an overvoltage limiting value $U_{max}$ as an upper voltage tolerance limit, while the undervoltage comparison unit 36 is programmed with a lower voltage tolerance limit as an undervoltage limiting value $U_{min}$, this being for the purpose of producing a comparison value. The two tolerance limits are adjustable and are normally not exceeded by the actual voltage value, nor does the actual voltage value fall below the two tolerance limits.

The outputs of comparison units 35 and 36 are connected to a common AND-gate 37, the output thereof driving a relay 23 connected to ground 34, the relay contact 23 being the normally-open contact 20 shown as part of the voltage monitor 18 in FIG. 1.

When the printing press is initially installed, the line voltage $U_N$ is applied via the voltage change-over switch unit 24 to the primary tap 3 of the power transformer. By turning on the non-illustrated main switch for starting up the press, the input voltage $U_N$ is thus applied to the primary coil 2, the voltage $U_N$ being transformed by the power transformer to a number of different voltage levels equal to the number of secondary coils. Amongst other, the voltage monitor 18 together with the voltmeter 19 have the control voltage $U_n$ applied thereto so that an optical or visual control for the pressman is provided by the voltmeter 19.

Immediately after the line voltage $U_N$ has been applied to the primary winding 2 of the power transformer 1 and before activation of the control systems, the voltmeter 18 tests whether control voltage $U_n$ presented thereto as the operating voltage comes within the voltage tolerance limits fixed or prescribed by the voltage comparison units 35 and 36 thereof.

If the voltage value is beyond these voltage limits, an error signal is produced by one of the voltage comparison units 35 and 36 and is applied as a logical signal state L to one of the two inputs of the AND-gate 37 thereby being at this signal state as well. For this reason, the relay 23 is not powered, and the normally-open contact 20 in the voltage monitor 18 remains open. The circuit for powering or actuating the contactor solenoid 9 as well as the contactor contacts 8 thereof in the control system lines 5 remain further in open condition so that the control system is not switched on.

If, however, the voltage measured by the voltage monitor 18 lies within the prescribed voltage tolerance limits, the two inputs and furthermore, the output of AND-gate 37 will be at the signal state H and, for this reason, the coil of the relay 23 connected to the output of the gate 37 has voltage applied thereto and turned on so that the contact 20 in the monitor 18 is closed. The circuit in which the contactor solenoid 9 is connected is then closed and powered. Because of this, the appertaining contactor contacts 8 are magnetically attracted and closed thereby in the lines 5. The voltage supply to the machine control unit 7 is thereby assured.

In the event of a disruption during operation of the press, the voltage monitor 18, upon determination of an impermissible under or overvoltage, respectively, lets the contactor solenoid 9 drop out via the normally open contact 20, which results in the switching off of all of the control system voltages $U_1$ to $U_n$ for the loads 6 in the aforedescribed manner.

The pressman recognizes the error signal of the voltage monitor 18 by an otherwise non-illustrated nor described control indicator on the control console of the printing press, which may, for example, be in the form of a lamp or LED. When such an error signal appears, the control indicator i.e. the warning lamp or the like, which is normally on, is extinguished.

Maintenance of the power or operating voltage for the voltage monitor 18 and the voltmeter 19 connected in parallel therewith is completely independent of a voltage error signal and interruption of the power supply to the machine control unit 7; the voltage $U_n$ is applied constantly to the voltage monitor 18 and the voltmeter 19. In the event of an error, the pressman must therefore determine from the subdivided indication or display of the voltmeter 19, whether the voltage present is in the undervoltage or overvoltage range. In accordance with this determination, by means of the voltage changing switch unit 24, he matches the supply or control voltage of the press to the momentary or instantaneous line voltage $U_N$ then present at the primary coil 2 of the control system transformer 1. If the error signal has been produced, for example, by the voltage falling below the prescribed lower voltage limit $U_{min}$, the switing contact 25 is then switched over by the pressman, wither manually or by remote control, to the undervoltage terminal 27 with which a lower voltage is associated, which comes closest to the voltage reading indicated on the voltmeter 19. When an overvoltage is indicated or displayed, there is a switch-over of the switch contact 25, in opposite sense, to the overvoltage terminal 28.

The pressman can actuate the voltage changing switch unit 24 only when the non-illustrated main switch is switched off, or the monitor 18 has signaled or reported an error and the power supply is interrupted. It is only by opening the normally open contact 20, that the circuit in which the solenoid 10 is no longer energized, the driving plunger 30 thereof being freed or released so that the detent lever or arm 29 which is coupled with the switching contact 25 is adjusted or shifted.

When the main switch is turned on, after a voltage control by the voltage monitor 18 and subsequent releasing of the control system, the soilenoid or magnet 10 again attracts when the contact 20 is closed so that the plunger 30 of the solenoid 10 engages in the detent lever or arm 29, and thereby prevents actuation or operation of the voltage change-over switch unit (as long as the proper voltage is supplied) while the press is running. It is only when the normally open contact 20 of the voltage monitor 18 opens again and the solenoid magnet 10 is deenergized that a voltage change-over is possible.

Figure 3:
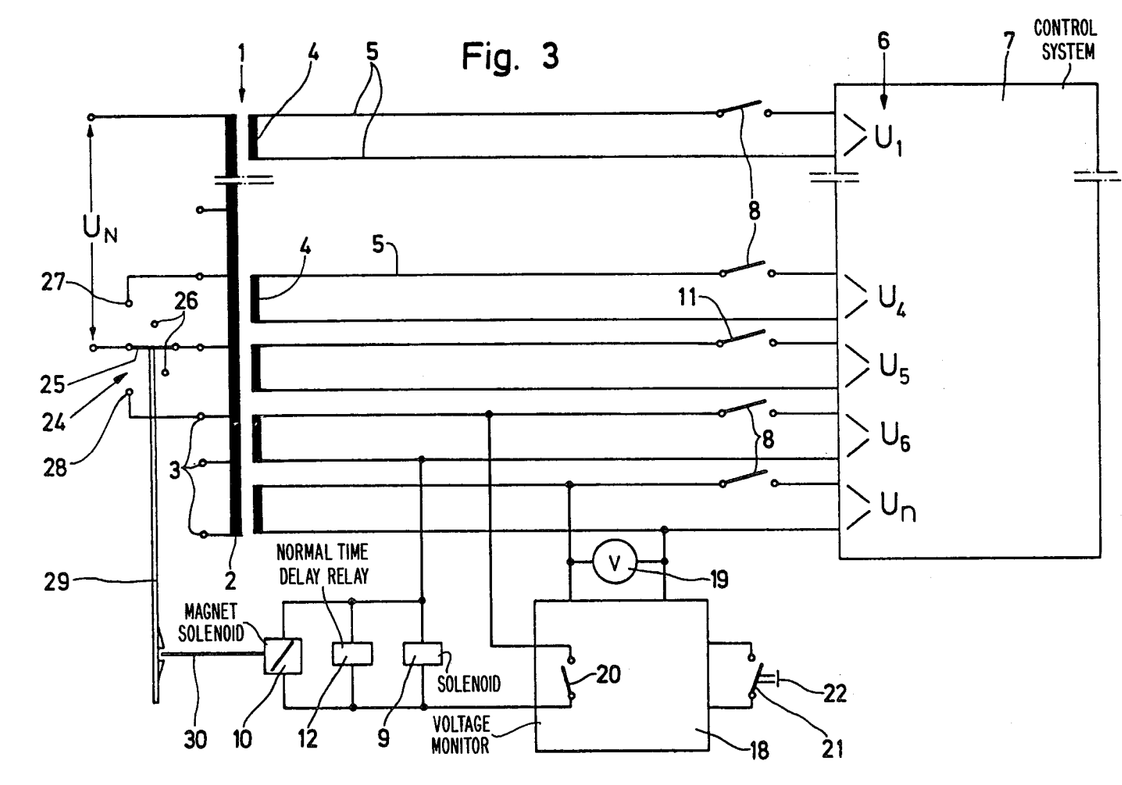
FIG. 3 is a view similar to that of FIG. 1 of the power supply unit of a printing machine with a preferred working embodiment of the safety unit of the invention.
Figure 4:
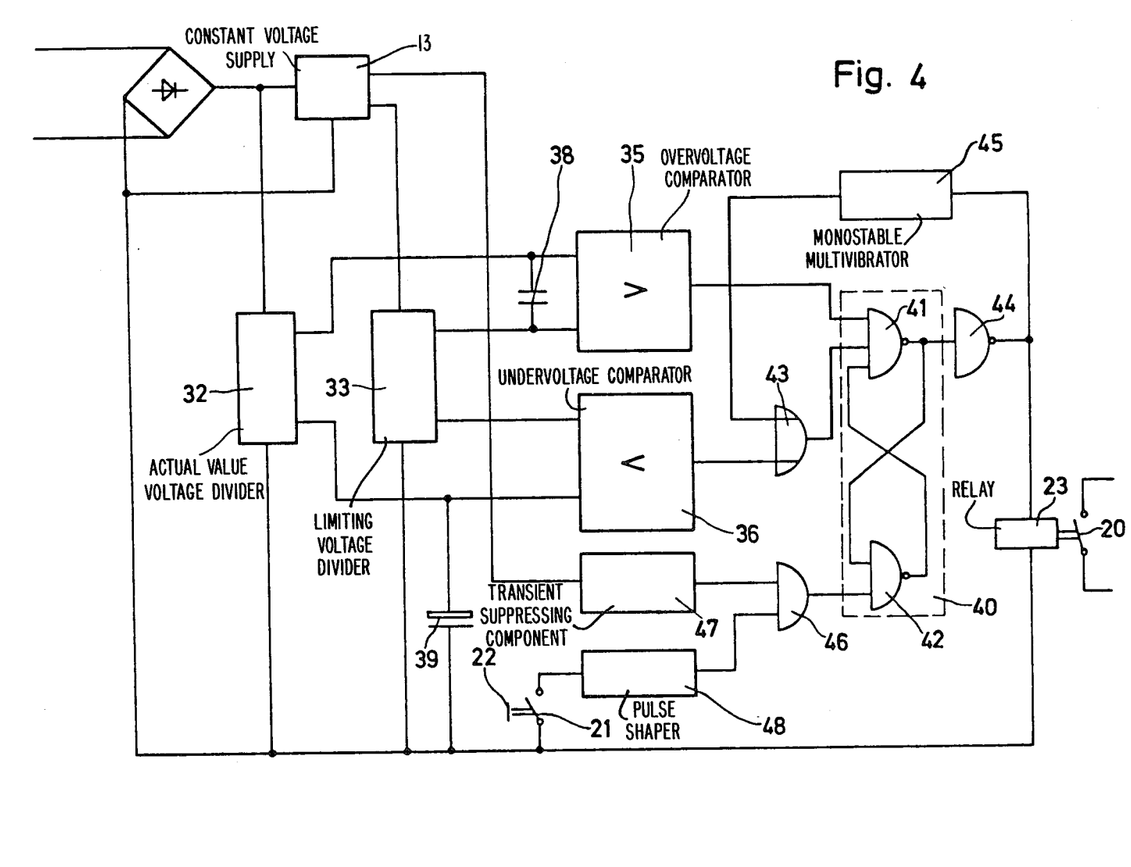
FIG. 4 is a block diagram of a voltage monitoring unit of the preferred working embodiment of the invention according to FIG. 3.

In the preferred embodiment of the invention shown in FIGS. 3 and 4, the voltage change-over switch unit 24, in addition, has two defined voltage cut-off positions 26, which are located between the respective primary tap 3 to which the line voltage $U_n$ is applied, and the undervoltage terminal 27 and the overvoltage terminal 28, respectively.

Furthermore, in the control line 5 which ensures the supply of the voltage $U_5$ for the brakes of the printing press, there is built in, instead of the contactor contact 8, a relay contact 11 which is actuated or operated with time delay through the use of commercially available time delay unit, which is best made in the form of normal time delay relay 12 which is connected in parallel with the contractor solenoid 9 as well as the solenoid magnet 10.

The voltage monitor 18 is provided, in the preferred embodiment of the invention shown in FIG. 3, with an outer reset terminal 21 controllable by a reset button 22.

As illustrated in FIG. 4, a differentiator 38, in the form of a capacitor, is connected between the two input terminals of the overvoltage comparator 35. In the lead or connecting line joining the actual value voltage divider 32 and the undervoltage comparator 36, there is an integrator 39 connected to ground 34, the integrator 39 being formed for example, likewise by a capacitor.

In the preferred embodiment of the invention shown in FIGS. 3 and 4, the printing press should not be turned on again even if the voltage is in order again, but rather, only by express demand. To make this possible, it is necessary for the error signal to be stored.

For this reason, the relay 23 is not triggered, as in the aforedescribed basic construction of the invention, directly by the AND-gate 37, but rather, is controlled by an intermediately connected error storage 40 constructed in the form of a flip-flop. The flip-flop storage or memory formed of two mutually cross-coupled NAND-gates 41 and 42, respectively, being a threshold NAND-gate 41 and a double NAND-gate 42. The outputs of either of the NAND-gates 41 and 42 are, respectively, connected as inputs to the other of the NAND-gates 42 and 41.

Two inputs of the threshold or three-input NAND-gate 41 are connected to the voltage comparators 35 and 36 i.e. one of the inputs thereof directly to the overvoltage comparator 35, and the other of the two inputs indirectly i.e. through the intermediary of an OR-gate 43, to the output of the undervoltage comparator 36.

The output of the flip-flop 40 is connected to a NOT-gate 44 having an output which not only controls or triggers the relay 23 but rather also is coupled or fed back to one of the three setting inputs of the flip-flop 40 through the intermediary of circuit components 43 and 45 for suppressing an undervoltage error signal. One of the circuit components 43 is an OR-gate and the other circuit component 45 is a monostable multivibrator connected to an input of the OR-gate 43. They serve to suppress an error signal when an undervoltage is produced due to current surges occurring when a load is turned on.

The second input of the NAND-gate 42 is provided as reset input of the flip-flop 40 and is connected to the output of an AND-gate 46 which, in turn, has an input which is connected to the constant voltage source 13 through the intermediary of a component 47 for suppressing transients caused by switching on. The second input of the AND-gate 46 extends via a pulse shaper 48 to a reset contact 21 referred to ground 34.

A more detailed account of the operation of the hereinafore-described preferred embodiment of the invention follows hereinafter.

During operation or running of the printing press, voltage surges may be produced which have undesired or disruptive effects upon the control voltages $U_1$ to $U_n$. In this regard, one must differentiate between energy-rich and energy-poor voltage surges. Energy-rich voltage surges may have damaging effects upon the electronic control units and may even be responsible or lead to destruction of the components thereof so that, in such a case, immediate interruption of the voltage or power supply to the press control unit is aimed for. On the other hand, energy-poor voltage surges should not be the cause of any voltage interruption because the electronic circuitry or systems of the press control unit 7 is designed for such surges or disruptive voltages.

For suppressing any voltage error signal caused by such energy-poor voltage surges, a capacitor 38 connected in the circuit between the two inputs of the overvoltage comparator 35 transmits high frequency voltage surges, which are reflected in the actual voltage value, to the overvoltage limiting value $U_{max}$. Exceedance of the limiting value $U_{max}$ and, therewith, an error signal are consequently prevented.

The control voltages $U_1$ to $U_n$ may not only be interfered with or disrupted by the aforementioned voltage surges but also by voltage fading which, if exceeding a given order of magnitude, may be responsible for uncontrolled functions, such as the opening or dropping-out of contactors, for example. For this reason, it is of value to avoid undervoltage error signal of the voltage monitor 18 resulting from a voltage fade which has not exceeded the aforementioned order of magnitude. For this purpose, a capacitor 39 is provided which is disposed in the circuit as an integrator on the input side of the undervoltage comparator 36 for acting upon the actual voltage value.

When there is a total breakdown or collapse of the voltage to a value of zero, the capacitor 39 has a very brief switching off time. If there is a voltage fade or drop to a value which is only a little under the undervoltage limiting value $U_{min}$, the switch-off time is increased by the changed discharge curve of the capacitor 39, an error signal being avoided if, within this time, the recuperating voltage again exceeds the under-voltage limiting value $U_{min}$. The capacitor 39 has a value which is in keeping with the desired requirements in regard to the functional reliability.

The switching conditions of the voltage monitor 18 during operation of the press are described hereinafter in greater detail.

Switch-on stage

Immediately after the voltage has been switched on by the nonillustrated main switch, the two voltage comparators 35 and 36, assuming the voltage value is normal, issue acceptance ("O.K.") signals so that the two inputs of the three-input NAND-gate 41 are at a logical signal state H. Simultaneously, the device 47 for suppressing signals when switched-on and which, for example, may be in the form of an RC-member, takes effect. It produces only for a given period of time (which is independent of the level of the constant voltage supplied thereto) a signal which, as a logical signal state L, appears at one input of the AND-gate 46 so that also the output of the latter and the reset input of the after-connected flip-flop 40 leading to the double or two-input NAND-gate 42 assumes the logical signal state L during this time. Because this L state is negated as a H state at the output of the NAND-gate 42 and the output signal thereof is fed back to an input of the triple or three-input NAND-gate 41, all of these three inputs thereof then have the logical signal state H so that, consequently, an L state prevails at the output of the NAND-gate 41. This thereby prevents any voltage error signal from being stored, during the transient period of the voltage occurring in the switch-on stage, until the logical signal state at the reset input of the flip-flop 40 has been changed over to the H state.

Through the NOT-gate 44 connected to the output of the NAND-gate 41, the logical signal state L is changed to an H state, and with this signal, after a generally conventional and therefore not further described amplification, the relay 23 is driven and voltage is applied to the relay coil thereof. The normally open contact 20 in the voltage monitor 18 is thereby closed and, via the contactor solenoid 9 and the contact or contacts 8 belonging thereto, the voltage supply of the printing press 18 is released or turned on.

Start-up stage

The instant the relay 23 has pulled up or attracted, after the voltage has been checked and the control system has been turned on by the voltage monitor 18, on demand, voltage is available for the loads 6, such as motors, electronic control units and the like, for example.

Because several motors may be started up simultaneously having starting currents which may be many times greater than the normal working currents thereof, there is a danger that a brief voltage fade or drop may be produced which could be responsible for an undervoltage error signal from the undervoltage comparator 36 and, for this reason, for interruption of power to the press control unit 7.

Because of the fact, however, that the voltage only takes a very short time to restore to a normal value after delay of the switch-on current surge, this time of the start-up stage must be bridged over, and an undesired voltage or power interruption must be prevented by the voltage monitor 18. Suppression of a voltage error signal due to this brief voltage fade or drop occurs via the undervoltage error suppressing system 43, 45 provided therefor and formed of the monostable multivibrator 45 connected to this OR-gate 43, the latter being disposed on the ourput side of both the multivibrator 45 and the undervoltage comparator 36. For a given bridging time period of, for example, 200 milliseconds, the H signal present at the input of the monostable multivibrator 45, with which the relay 23 is controlled as well, is responsible for a pulse in the form of an H-state signal being produced at the second input of the OR-gate so that the output of the latter as well, assumed this signal state. For this reason, the OR-gate 43, for the bridging period, is blocked with respect to any error signal from the undervoltage comparator 36, such signal being suppressed until the signal state of the upper input of the OR-gate 43, as viewed in FIG. 4, after termination of the bridging time period, is changed to the logical signal stage L once the pulse time of the monostable multivibrator 45 has run its course. The bridging time period is such that an L state signal is produced again at the output of the monostable multivibrator 45 only after the voltage has reliably recovered tha normal value thereof.

At this instant, one may assume that the undervoltage comparator 36, a normal voltage being assumed, produces a "voltage acceptable" signal so that, as before, the same logical signal state H is maintained at the output of the OR-gate 43.

After the aforementioned switch-on suppression time has run its course, the logical signal state at the upper input of the AND-gate 46, as viewed in FIG. 4, changes to the H-state.

Because the second input of the AND-gate 46 on normal operation of the press i.e. with a non-triggered and thus open reset contact 21 will also be at the logical signal state H at all times, the output also assumes this signal state and transmits it to the input of the double or two-input NAND-gate 42. The third input of the NAND-gate 41, which is coupled back to the output of the NAND-gate 42, thus further conducts the logical signal state H which, together with the two other inputs, is responsible for an L state at the output of the NAND-gate 41 and thereby, via the NOT-gate 44, a continual control of the relay 24 is afforded. The stage of normal operation of the press will then have been reached with regular monitoring of the voltage.

Error signals

If the input voltage is impermissible under or over the rated voltage range, one of the two voltage comparators 35 and 36, respectively, produces a voltage error signal. In the following consideration of a trouble condition, it is assumed that the voltage becomes less than the undervoltage limit value $U_{min}$ and an error signal is produced by the undervoltage comparator 36 so that the logical signal state at the lower input of the OR-gate 43, as viewed in FIG. 4, is changed to L which, consequently, is accepted or assumed by the output as well. Because of this, a logical signal state L is present at the middle input of the triple or three-input NAND-gate 41 so that the output thereof is changed over to the H state. The latter signal is transformed by the next component, the post-connected NOT-gate 44, the L state causing the relay 23 to be turned off, whereby the normally open contact 20 in the voltage monitor 18 is opened. The circuit of the contactor solenoid 9 is then opened and the appertaining contacts 8 under contactor control in the control lines 5 are opened for the purpose of interrupting the voltage or power supply.

The memory function of the flip flop 40 is attained in a manner that the logical signal state H appearing at the output of the NAND-gate is provided at the upper input of the NAND-gate 42, as viewed in FIG. 4. Because the logical signal state H exists, as before, at the reset input of the flip flop 40, which corresponds to the second input of the NAND-gate 42, the opposite signal state i.e. L, appears at the negated output of the NAND-gate 42 and is fed back to the third, lower input of the NAND-gate 41, as viewed in FIG. 4, so that two of the three inputs thereof are then at this signal state. Even if the undervoltage comparator 36 again generates an acceptance signal, and the second, middle input of the NAND-gate 41, as viewed in FIG. 4, is thereby retransformed to the logical signal state H, the error or error signal remains stored in the flip flop 40 due to the signal state L present at the third input and the signal state thereof is not changed. Due to this storage of the error signal, frequent switching on and off of the power or voltage supply is avoided and, simultaneously, the pressman and other operating personnel are alerted to a voltage defect or deficiency.

Shutting down of the press is started in a conventional manner by using a solenoid magnet, which is otherwise not shown or described herein, and is completed by utilizing the rotational motion or moment of inertia of the cylinders of the press with conventional mechanical methods.

Normally, an interruption of the power supply by the voltage monitor 18 results in immediate stopping of the press because the control voltage for the brakes is shut off instantaneously. Because of this, it is no longer possible to be certain, especially for low printing speeds, that the press will stop which is likely to result in unnecessary damage to the blanket (flattening, sticking to the cylinder, damage to the printing plate, and the like, the disposal or rectification of which is time-consuming and costly, for example, for changing the blanket and/or the plate and washing the cylinders, and the like. For this reason, the supply voltage $U_5$ for controlling the brakes should not be cut off at the same time as the other power supplies or control voltages but only after a time delay so that there is enough time for stopping the printing or moving the parts of the press into non-printing condition. Therefore, the relay contact 11 used for controlling the brake power or voltage in the control line 5 is not under the control of the contactor solenoid 9 like the other contactor contacts 8 but rather, is under the control of the time delay relay 12.

The latter ensures that the appertaining relay contact 11 is opened only after a delay of, for example, 2.5 seconds, which is sufficiently long to ensure stopping of the printing or that the parts of the printing press will be moved into non-printing position thereof. It is only thereafter that the brakes of the press are put into operation.

Resetting (Clearing Memory)

For cancelling a stored error signal and resetting the flip flop 40 to the original condition thereof, it is advantageous for the pressman or other operating personnel to perform an error diagnosis by means of the voltmeter 19. In accordance with the results thereof, various measures for resetting the memory are possible.

(1) Cancelling the memory by means of the reset button 22 whereby, with the reset contact 21 closed, a static signal on the output side of the pulse shaper 48 is transformed into a dynamic pulse which, as a resetting signal, is present at the resetting input of the flip flop 40. Therefore, there will be no clearing of the flip flop 40 or memory simply by continuously pushing the reset button of the reset contact 21.

(2) Cancelling due to conventional removal or turning-off of the line voltage $U_N$ by means of the main switch.

(3) Cancelling by matching the control voltages $U_1$ to $U_n$ to the instantaneous line voltage $U_N$ by means of the voltage changing switch unit 24, wherein when changing-over the switch contact 25 to the undervoltage terminal 27 or the overvoltage terminal 28, one of the two defined voltage interrupt or shut-off positions 26 must be overrun. The two voltage shut-off positions 26 are in the form of mechanical locks or detents which, when swept or run over by the switching contact 25, forcibly effect a cutoff or interruption of the supply voltage because of a time delay. The voltage monitor 18 is thereby cut off from power or voltage briefly so that, necessarily, the flip flop 40 is reset and the error signal stored therein is cancelled, as noted under point (2) hereinabove.

As mentioned hereinbefore, it is obvious that the invention of the instant application is not limited to the embodiment shown in the figures and described in the specification. It will, in fact, be clear that numerous structural variations, especially with respect to using equivalent electro-mechanical and electronic components offered in the market place, nevertheless lie within the scope of the invention.

There are claimed:

1. Electrical safety device for a control system of a printing machine having a control transformer with a plurality of primary and secondary taps for varying voltage levels comprising respective control lines connected to said secondary taps, a voltage monitoring device for monitoring impermissible voltage variations, said voltage monitoring device being connected in a respective control line of one of said secondary taps which is representative of all of the control lines, switch means for automatically switching off all of said control lines to said secondary taps so as to prevent damage to electronic components connected to said control lines, error signalling means coupled with said voltage monitoring device for alerting an operator of the printing machine to an impermissible voltage variation, and a manually operative voltage changing switching device operatively associated with one of said primary taps for adapting a control voltage to variations of a supply voltage.

2. Electrical safety device according to claim 1 wherein said voltage monitoring device comprises an overvoltage comparator and an undervoltage comparator.

3. Electrical safety device for controlling a printing machine having a control transformer with a plurality of primary and secondary taps for varying voltage levels comprising respective control lines connected to said secondary taps, a voltage monitoring device connected in a respective control line of one of said secondary taps, and a voltage changing switching device operatively associated with one of said primary taps, said voltage monitoring device being coupled with said voltage changing switching device, said voltage monitoring device including an error signal memory having a resetting device.

4. Electrical safety device for controlling a printing machine having a control transformer with a plurality of primary and secondary taps for varying voltage levels comprising respective control lines connected to said secondary taps, a voltage monitoring device connected in a respective control line of one of said secondary taps, and a voltage changing switching device operatively associated with one of said primary taps, said voltage monitoring device being coupled with said voltage changing switching device, said voltage monitoring device including means for suppressing transients produced when switching-on for preventing production of a voltage error signal and/or storage thereof while transients are present in the voltage during the switch-on phase.

5. Electrical safety device for controlling a printing machine having a control transformer with a plurality of primary and secondary taps for varying voltage levels comprising respective control lines connected to said secondary taps, a voltage monitoring device connected in a respective control line of one of said secondary taps, and a voltage changing switching device operatively associated with one of said primary taps, said voltage monitoring device being coupled with said voltage changing switching device, said voltage monitoring device including means for suppressing undervoltage error signals resulting from switch-on voltage surges.

6. Electrical safety device for controlling a printing machine having a control transformer with a plurality of primary and secondary taps for varying voltage levels comprising respective control lines connected to said secondary taps, a voltage monitoring device connected in a respective control line of one of said secondary taps, and a voltage changing switching device operatively associated with one of said primary taps, said voltage monitoring device being coupled with said voltage changing switching device, said voltage monitoring device including differentiator means for suppressing an overvoltage error signal resulting from energy-poor voltage surges, and integrator means for suppressing an undervoltage error signal for voltage drops down to a given order of magnitude.

7. Electrical safety device according to claim 1 wherein said voltage monitoring device has timing means effective after a time delay for time-delayed switching off of at least one control voltage.

8. Electrical safety device according to claim 1 wherein said voltage changing switching device has an undervoltage terminal and an overvoltage terminal and at least two additional voltage interruption positions.

9. Electrical safety device according to claim 1 wherein said voltage changing switching device has an electromechanical arresting device.

10. Electrical safety device for controlling a printing machine having a control transformer with a plurality of primary and secondary taps for varying voltage levels comprising respective control lines connected to said secondary taps, a voltage monitoring device connected in a respective control line of one of said secondary taps, and a voltage changing switching device operatively associated with one of said primary taps, said voltage monitoring device being coupled with said voltage changing switching device, said voltage monitoring device having voltage measuring means connected in parallel therewith, and having a normally open contact, a contactor solenoid connected in series with said normally open contact, a magnet solenoid connected in parallel with said contactor solenoid and having a control voltage applied thereto in common with said contactor solenoid, contactor contacts disposed in the respective control lines and being controllable by said contactor solenoid, said voltage changing switching device having a switching contact, a detent lever linked to said switching contact, and said magnet solenoid having a switch plunger engaging in said detent lever.

11. Electrical safety device for controlling a printing machine having a control transformer with a plurality of primary and secondary taps for varying voltage levels comprising respective control lines connected to said secondary taps, a voltage monitoring device connected in a respective control line of one of said secondary taps, and a voltage changing switching device operatively associated with one of said primary taps, said voltage monitoring device being coupled with said voltage changing switching device, said voltage monitoring device comprising an overvoltage comparator and an undervoltage comparator and also having a normally open contct and a rectifier with an output, an actual-value voltage divider connected to said output of said rectifier, a constant voltage source also connected to said output of said rectifier and to a limiting voltage divider for supplying voltage thereto, both said actual-value voltage divider and said limiting voltage divider being connected to said overvoltage and undervoltage comparators, both said comparators having outputs connected in common to an AND-gate having an output, a relay having an input connected to said output of said AND-gate and being operatively associated with said normally open contact for controlling said contact, said relay being controllable by an output signal from said AND-gate.

12. Electrical safety device for controlling a printing machine having a control transformer with a plurality of primary and secondary taps for varying voltage levels comprising respective control lines connected to said secondary taps, a voltage monitoring device connected in a respective control line of one o said secondary taps, and a voltage changing switching device operatively associated with one of said primary taps, said voltage monitoring device being coupled with said voltage changing switching device, said voltage monitoring device comprising an overvoltage comparator, an undervoltge comparator, an error signal memory having a resetting device, and differentiator means for suppressing an overvoltage error signal resuting from energy-poor voltage surges, and integrator means for suppressing an undervoltage error signal for voltage drops down to a given order of magnitude, said differentiator means being connected between two inputs to said overvoltage comparator, and said integrator means being connected between an actual-value voltage divider and said undervoltage comparator, said overvoltage and undervoltage comparators having outputs connected to said error signal memory, said voltage monitoring device also including means for suppressing transients produced when switching-on, a reset input for said error signal memory controllable alternatively via said means for suppressing transients and via said resetting device, a NOT-gate connected to the output of said error signal memory and having an output, in turn, said means for suppressing said undervoltage error signal being connected to the output of said NOT-gate and having an output, in turn, connected to a setting input of said error signal memory, said output of said NOT-gate being also connected to a relay operatively associated with a normally open contact of said voltage monitoring device for controlling said contact.

13. Electrical safety device according to claim 10 wherein said voltage monitoring device has timing means effective after a time delay for time-delayed switching off of at least one control voltage, wherein said delay timing means is a time delay relay connected in parallel with said contactor solenoid and said magnet solenoid, and wherein one of said control lines is for controlling brakes of the printing machine, said one control line having at least one relay contact connected therein, said time delay relay being connected to said relay contact for controlling said relay contact.

14. Electrical safety device for controlling a printing machine having a control transformer with a plurality of primary and secondary taps for varying voltage levels comprising respective control lines connected to said secondary taps, a voltage monitoring device connected in a respective control line of said secondary taps, an erasable error signal memory connected to said voltage monitoring device, a voltage changing switching device operatively associated with one of said primary taps, said voltage changing switching device being coupled with said voltage monitoring device, said voltage changing switching device having an undervoltage terminal and an overvoltage terminal and means including said undervoltage and overvoltage terminals for matching the control voltages of the safety device with instantaneous existing line voltage.

* * * * *